(No Model.)
H. B. COBB.
JOINT FOR ELECTRIC CONDUCTORS.
No. 429,306. Patented June 3, 1890.
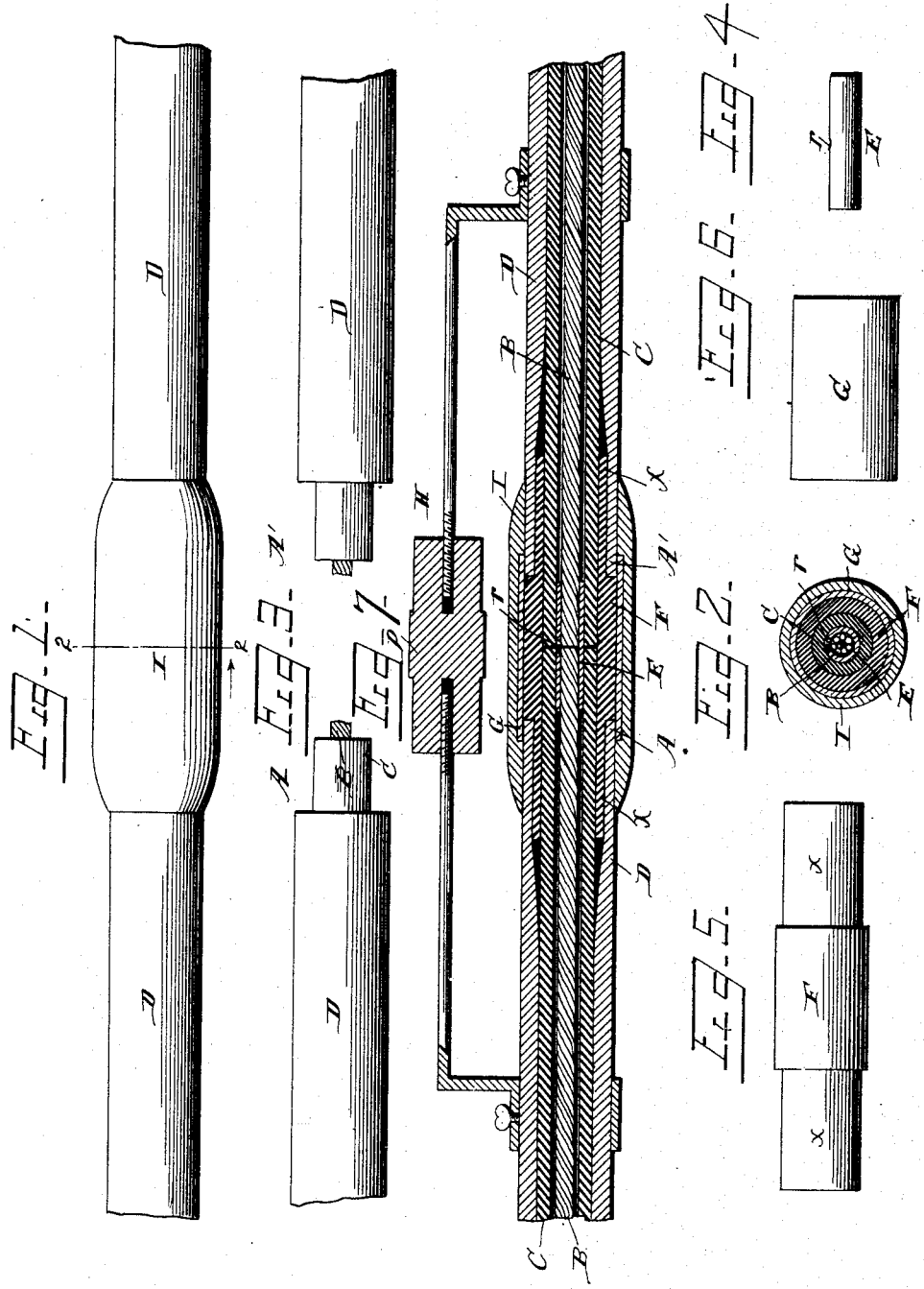
Witnesses:
Geo. G. Thorp.
Bruce S. Elliott.
Inventor:
Henry B. Cobb.
by Dyrenforth & Dyrenforth
his Attorneys.

UNITED STATES PATENT OFFICE.

HENRY B. COBB, OF WILMINGTON, DELAWARE, ASSIGNOR TO THE COBB VULCANITE WIRE COMPANY, OF DELAWARE.

JOINT FOR ELECTRIC CONDUCTORS.

SPECIFICATION forming part of Letters Patent No. 429,306, dated June 3, 1890.

Application filed November 8, 1889. Serial No. 329,618. (No model.)

*To all whom it may concern:*

Be it known that I, HENRY B. COBB, a citizen of the United States, residing at Wilmington, in the county of New Castle and State of Delaware, have invented a new and useful Improvement in Joints and the Method of Manufacturing the Same in Electric Conductors, of which the following is a specification.

My invention relates to an improvement in the joining of the class of conductors employed in electric underground systems, and involving an insulated wire inclosed in a metal covering.

In the joining of conductors of the class referred to great care has to be exercised and great difficulty is experienced in producing a so-called "perfect joint," meaning thereby one that shall be and remain impervious to air, gas, and moisture. As hitherto formed the operation has been essentially slow, entailing consequent expense, and without affording anything like uniformity in perfection in the joints, and, besides, the latter have been clumsy in appearance and large in comparison to the diameter of line provided with them.

The objects of my invention are materially to simplify the manner of producing the junction, thereby greatly to expedite the operation and reduce the cost thereof and to permit the formation of uniformly perfect joints.

My invention involves the method of procedure in manufacturing my improved joint, as also the joint resulting from such procedure.

In the accompanying drawings, Figure 1 is a view in elevation of my improved joint applied to a wire inclosed in a tube of hard rubber covered with lead; Fig. 2, a section taken on the line 2 of Fig. 1 and viewed in the direction of the arrow. Fig. 3 shows two severed ends of the conductor preparatory to its being joined by means of my improvement. Figs. 4, 5, and 6 represent details employed in the manufacture of the joint; and Fig. 7 is a sectional diagrammatic representation showing the two severed ends illustrated in Fig. 3 as having been brought together and there held by a clamping-tool while the joint is being manufactured.

A and A' represent each an end of an electric conductor comprising wire B, inclosed in hard-rubber tubing C, covered with lead D.

The first step preparatory to forming the joint consists in baring the ends of the wires B, which may readily be done by pulling the wires out, particularly when formed of twisted strands, and because there is always some slack inside the tubing. A metal (copper) ferrule E, of a diameter adapted to admit the wire and provided between its extremities with an orifice $r$, is then slipped over the end of one of the wires. A section or ferrule F of insulating material, preferably hard-rubber tubing, equaling or about equaling in diameter that of the lead covering D, and reduced toward opposite extremities, as shown at $x$, Fig. 5, to or about to the internal diameter of the lead covering, is then slipped over an end of the wire B and of the rubber tubing C, covering it, with one of the reduced ends $x$ of the ferrule slipped inside the metal covering D to get it out of the way while the ends are being secured in the manner hereinafter described. A ferrule G, of metal, (preferably externally-tinned copper,) of a diameter adapting it to fit around the lead covering D, is also slipped over an end B and upon the lead D. All the parts described are then in position to be readily utilized in making the joint. The ends of the wires B are first brought together, as shown in Fig. 7, and there held by means of a suitable clamping-tool H, adapted, as shown, to grip the ends of the conductor around the external lead covering D, and to be adjusted to bring the gripping portions closer together by operating a nut or turn-buckle $p$ for the purpose. This clamping-tool involves no features of novelty forming part of my present invention, but may be of the kind well known for analogous purposes, and need not, therefore, be herein minutely described. When the ends of the two wires B have been thus brought together, the metal ferrule E is slipped over them, preferably far enough to bring its orifice $r$ coincident with the line of contact of the two ends. Solder is then poured into the orifice $r$ to secure the ends of the wire together. The clamping-tool H is then manipulated to draw the separated ends of the lead tubing D toward each other (and with them, of course, the ends of the inclosed rubber tubing) until they meet at the offsets or shoulders at opposite ends of the enlarged portion of the hard-rubber ferrule F, the reduced ends $x$ of which are then slipped inside the lead tubing D. Finally the copper ferrule G is slipped over the hard-rubber ferrule F, when all is in readiness to have the external covering or sheath I of lead molded upon the joint to extend some distance over the separated ends of the lead tubing D, the molding being performed in any convenient manner, preferably by inclosing the joint in a suitable mold and pouring the lead into it. The joint is then finished and the mold (if used) and clamping-tool H are removed.

A joint may thus be formed readily and rapidly, is neat and symmetrical in appearance, does not materially increase the diameter of the conductor, and affords perfect protection to the conductor, which is at least as perfect at its joints as elsewhere throughout its length.

What I claim as new, and desire to secure by Letters Patent, is—

1. The method of joining the separated ends of a metal-covered electric conductor, which consists in bringing together and securing the ends of the wire, inclosing the said connected ends in insulating material, and inclosing the joint thus partly formed in metal, substantially as described.

2. The method of joining the separated ends of a metal-covered insulated electric conductor, which consists in bringing together and permanently securing the ends of the wire, then inclosing the said connected ends in insulating material, then inclosing the said insulating material in a metallic shield, and finally molding over the joint thus partly formed a metal sheath, joining the separated ends of the metal covering of the conductor, substantially as described.

3. The method of joining the separated ends of a lead-covered insulated electric conductor, which consists in bringing together the ends of the wire and soldering them inside a metal ferrule, then inclosing the said metal ferrule in a ferrule of hard insulating material and introducing the ends of the said hard insulating-ferrule into the adjacent ends of the lead covering of the conductor, and inclosing the joint thus partly formed in metal, joining the separated ends of the lead covering of the conductor, substantially as described.

4. The method of joining the separated ends of a lead-covered insulated electric conductor, which consists in bringing together the ends of the wire and soldering them inside a metal ferrule, then inclosing the said metal ferrule in a ferrule of hard insulating material and introducing the ends of the said hard insulating-ferrule into the adjacent ends of the lead covering of the conductor, then inclosing the said hard insulating-ferrule in a metal ferrule, and finally molding over the joint thus partly formed a lead sheath, joining the separated ends of the lead covering of the conductor, substantially as described.

5. In an electric conductor formed of insulated wire inclosed in metal, means of joining separated ends of the conductor, comprising a metal ferrule E, having soldered together inside it the ends of the wire and inclosed in insulating material, and a molded metal sheath I, extending over the separated ends of the metal covering D of the conductor, substantially as described.

6. In an electric conductor formed of wire inclosed in insulating-tubing covered with lead, means for joining separated ends of the conductor, comprising a metal ferrule E, having soldered together inside it the ends of the wire, a ferrule F, of insulating-tubing, inclosing the ferrule E, and extending at opposite ends into the respectively adjacent ends of the lead covering D, a metal ferrule G, inclosing the ferrule F, and a molded lead sheath I, enveloping the ferrule G and extending over the separated ends of the lead covering D, substantially as described.

In witness whereof I have hereunto subscribed my name in the presence of two witnesses.

HENRY B. COBB.

Witnesses:
DOUGLAS DYRENFORTH,
BRUCE S. ELLIOTT.